US010146493B2

(12) United States Patent
Sun

(10) Patent No.: US 10,146,493 B2
(45) Date of Patent: Dec. 4, 2018

(54) METHOD FOR STARTING A SCREEN OF A DUAL-SCREEN MOBILE DEVICE

(71) Applicant: HISENSE MOBILE COMMUNICATIONS TECHNOLOGY CO., LTD., Qingdao (CN)

(72) Inventor: Hui Sun, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 50 days.

(21) Appl. No.: 15/368,860

(22) Filed: Dec. 5, 2016

(65) Prior Publication Data

US 2017/0083272 A1    Mar. 23, 2017

(30) Foreign Application Priority Data

May 11, 2016    (CN) .......................... 2016 1 0312002

(51) Int. Cl.
*G06F 3/14*    (2006.01)
*G06F 3/0487*    (2013.01)

(52) U.S. Cl.
CPC .......... *G06F 3/1423* (2013.01); *G06F 3/0487* (2013.01); *G09G 2330/026* (2013.01); *G09G 2330/027* (2013.01)

(58) Field of Classification Search
CPC ................ G06F 3/1423; G06F 1/1647; G09G 2300/023
See application file for complete search history.

(56) References Cited

U.S. PATENT DOCUMENTS

| 2009/0197615 | A1* | 8/2009 | Kim ...................... H04M 1/605 |
| | | | 455/456.1 |
| 2012/0019456 | A1* | 1/2012 | Choi ................... G06F 3/04847 |
| | | | 345/173 |
| 2015/0116362 | A1* | 4/2015 | Aurongzeb ........... G06F 3/1446 |
| | | | 345/650 |
| 2017/0277499 | A1* | 9/2017 | Liang .................... G06F 3/1423 |

\* cited by examiner

*Primary Examiner* — Sepehr Azari
(74) *Attorney, Agent, or Firm* — Harness, Dickey & Pierce, P.L.C.

(57) ABSTRACT

Embodiments of the disclosure provide a method and apparatus for starting a screen of a mobile device including a first screen and a second screen, the method including: detecting a screen starting operation; detecting and obtaining at least one of a first measurement parameter corresponding to the first screen, and a second measurement parameter corresponding to the second screen; determining a screen to be started, from the first screen and the second screen according to the detected at least one of the first measurement parameter and the second measurement parameter; and starting the determined screen. The embodiments of the disclosure enable the screen to be started adaptively to thereby avoid the user from operationally selecting the screen manually so as to improve the convenience in starting the screen.

11 Claims, 7 Drawing Sheets

METHOD FOR STARTING A SCREEN OF A DUAL-SCREEN MOBILE DEVICE

CROSS-REFERENCE TO RELATED APPLICATION

This application claims the benefit and priority of Chinese Patent Application No. 201610312002.3 filed May 11, 2016. The entire disclosure of the above application is incorporated herein by reference.

FIELD

The present disclosure relates to the field of mobile devices, and particularly to a method for starting a screen of a mobile device, and a mobile device.

BACKGROUND

This section provides background information related to the present disclosure which is not necessarily prior art.

As the mobile communication technologies are developing, and mobile devices, e.g., mobile phones, etc., become increasingly popularized, our living, learning, and working has been greatly facilitated.

As there are a growing variety of demands of users for the mobile devices, some mobile devices have been equipped with two screens located respectively on the front sides and the backsides of the mobile devices.

SUMMARY

This section provides a general summary of the disclosure, and is not a comprehensive disclosure of its full scope or all of its features.

Embodiments of the disclosure provide a method for starting a screen of a mobile device, and a corresponding mobile device.

An embodiment of the disclosure discloses a method for starting a screen of a mobile device including a first screen and a second screen, the method including:

detecting a screen starting operation;

detecting and obtaining at least one of a first measurement parameter corresponding to the first screen, and a second measurement parameter corresponding to the second screen;

determining a screen to be started, from the first screen and the second screen according to the detected at least one of the first measurement parameter and the second measurement parameter; and starting the determined screen.

An embodiment of the disclosure disclose a mobile device including a first screen, a second screen, and a screen starting apparatus; the screen starting apparatus is configured:

to detect a screen starting operation; to detect and obtain at least one of a first measurement parameter corresponding to the first screen, and a second measurement parameter corresponding to the second screen; to determine a screen to be started, from the first screen and the second screen according to the detected at least one of the first measurement parameter and the second measurement parameter; and to start the determined screen.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
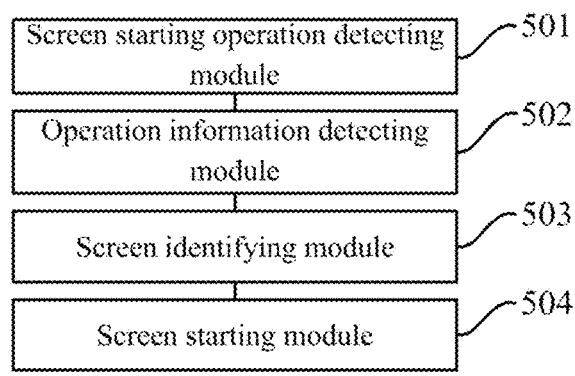
Figure 6:
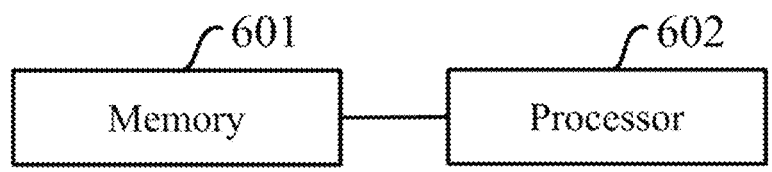
Figure 7:
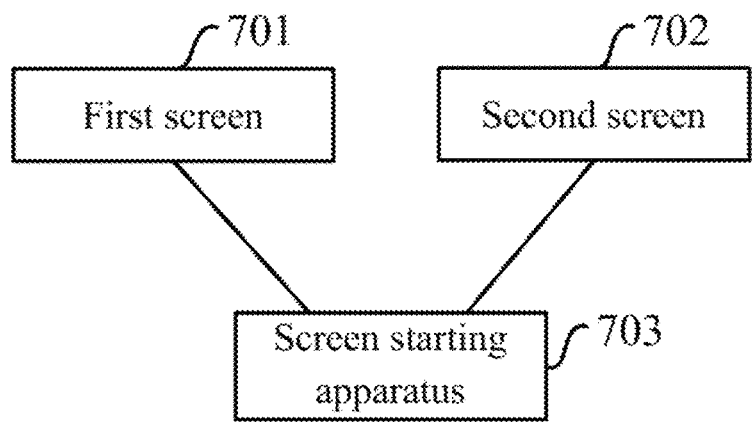

FIG. 4a~FIG. 4f are schematic flow charts of identifying a screen to be started according to some embodiment of the disclosure;

FIG. 5 is a structural block diagram of an apparatus for starting a screen of a mobile device according to some embodiments of the disclosure;

FIG. 6 is a structural block diagram of an apparatus for starting a screen of a mobile device according to some embodiments of the disclosure; and FIG. 7 is structural block diagram of a mobile device according to some embodiments of the disclosure.

Corresponding reference numerals indicate corresponding parts or features throughout the several views of the drawings.

DETAILED DESCRIPTION

Example embodiments will now be described more fully with reference to the accompanying drawings.

A mobile device according to embodiments of the disclosure includes at least two screens which are a first screen and a second screen respectively, where when the first screen and the second screen are locked, if a screen starting operation is detected, then at least one of a first measurement parameter corresponding to the first screen, and a second measurement parameter corresponding to the second screen will be detected to determine measurement information related to the screen starting operation, it will be determined whether a user's operating habit of holding the mobile device in his or her hand (i.e., a habit of orienting the first screen or the second screen of the mobile device to the user operating the mobile device) according to the at least one of the first measurement parameter and the second measurement parameter, and a screen to be started will be identified from the first screen and the second screen, and started, so that the screen can be started adaptively while avoiding the user from operationally selecting the screen manually to thereby improve the convenience in starting the screen, and particularly the user can be avoided from memorizing the correspondence between the screen and a switch button, and toggling the switch button improperly, resulting in starting the screen unduly, as in the prior art, thus improving the accuracy in starting the screen.

Figure 1:
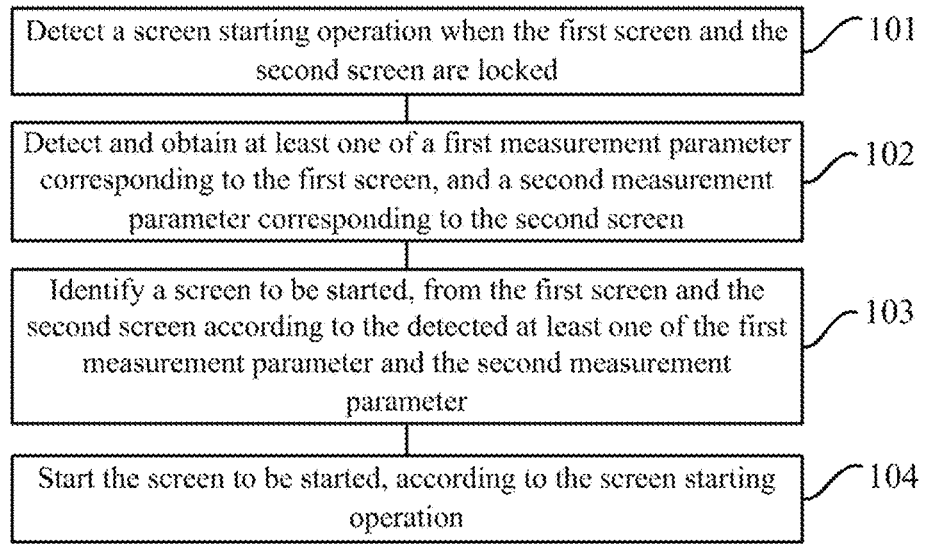
FIG. 1 is a flow chart of steps in a method for starting a screen of a mobile device according to some embodiments of the disclosure.

Referring to FIG. 1, there is illustrated a flow chart of steps in a method for starting a screen of a mobile device according to an embodiment of the disclosure, where the method can particularly include the following steps:

The step 101 is to detect a screen starting operation when the first screen and the second screen are locked;

In a particular implementation, the embodiment of the disclosure can be applicable to a mobile device including screens, particularly a mobile phone, a tablet computer, a personal digital assistant, a wearable device (e.g., eyeglasses, a watch, etc.), etc.

Operating systems of these mobile devices can include Android, IOS, Windows Phone, Windows, etc.

In order to enable those skilled in the art to better understand the embodiments of the disclosure, the embodiments will be described in this description taking the Android operating system as an example.

Furthermore in the embodiments of the disclosure, the mobile device includes at least two screens, that is, the mobile device can include at least the first screen and the second screen, and these two screens are typically positioned opposite to each other, for example, the first screen is located on the front side of the mobile device, and the second screen is located on the backside of the mobile device, or the first screen is located on the backside of the mobile device, and the second screen is located on the front side of the mobile device.

Particularly one of the screens is generally a primary screen typically configured as a high-definition (1280*720 or 1920*1080) screen, e.g., a Thin Film Transistor (TFT) liquid crystal screen, etc., arranged on the front side of the mobile device to display various information of the mobile device.

The other screen is generally a secondary screen typically configured as a low-definition (480*320 or 640*480) screen, e.g., a TFT liquid crystal screen, an ink screen, etc., arranged on the back side of the mobile device to assist in displaying various states of the mobile device, e.g., a battery lifetime, a contact, an unread short message, a missed call, a displayed dial keypad, weather information, electronic book reading, etc.

For example, if a primary screen is the first screen, and the first screen is a liquid crystal screen, then the second screen will be an ink screen; or If the primary screen is the second screen, and the second screen is a liquid crystal screen, then the first screen will be an ink screen.

Of course, the two screens of the mobile device can be configured as other screens than the primary screen and the secondary screen, for example, both the screens can be high-definition screens, or both the screens can be low-definition screens, etc., although the embodiments of the disclosure will not be limited thereto.

For the sake of a convenient description, the screen located on the front side of the mobile terminal, i.e., the primary screen, is the first screen, and the screen located on the back side of the mobile terminal, i.e., the secondary screen, is the second screen, in the embodiments of the disclosure.

If the user has not operated the mobile device for some period of time, then the system will go to the suspend state, or if the user presses a standby function button briefly, then the system will go to the suspend state.

In the suspend state, the first screen and the second screen of the mobile device are locked, that is, there is no response to a general operation by the user, thus preventing an improper operation.

In a real application, the suspend state can be defined by those skilled in the art under a real condition.

For example, the suspend state in the Android (Linux) system generally includes the following three steps:

The first step is to freeze a user-state process and a kernel-state task;

The second step is to invoke a suspend recall function of a registered device; and The third step is to suspend the kernel of the device, and to put the Central Processing Unit (CPU) into a suspend-state freezing process in which the kernel sets the states of all the processes in a list of processes to Suspend, and stores the contexts of all the processes.

For one of the locked screens, it can be started by triggering the screen starting operation.

Particularly the screen starting operation can refer to an operation to start the screen, e.g., to press down the standby function button, to insert a data line, to receive an incoming call, etc.

Taking as an example the operation to press down the standby function button, the standby function button can be pressed down in the Android system to trigger a KeyEvent.KEYCODE_POWER event, and some service in the system in the suspend state can remain operative, so that the service can detect the KeyEvent.KEYCODE_POWER event reported by a driver, and thus the screen starting operation.

The step 102 is to detect and obtain at least one of a first measurement parameter corresponding to the first screen, and a second measurement parameter corresponding to the second screen;

In the embodiments of the disclosure, since the first screen and the second screen are equipped, if the screen starting operation is detected, then the first measurement parameter corresponding to the first screen, and/or the second measurement parameter corresponding to the second screen will be detect, and further corresponding one of the screens will be selected and started.

Particularly the first measurement parameter and the second measurement parameter are such information related to the screen starting operation occurring that can characterize the state in which the mobile terminal is held in the hand of the user.

Figure 2A:
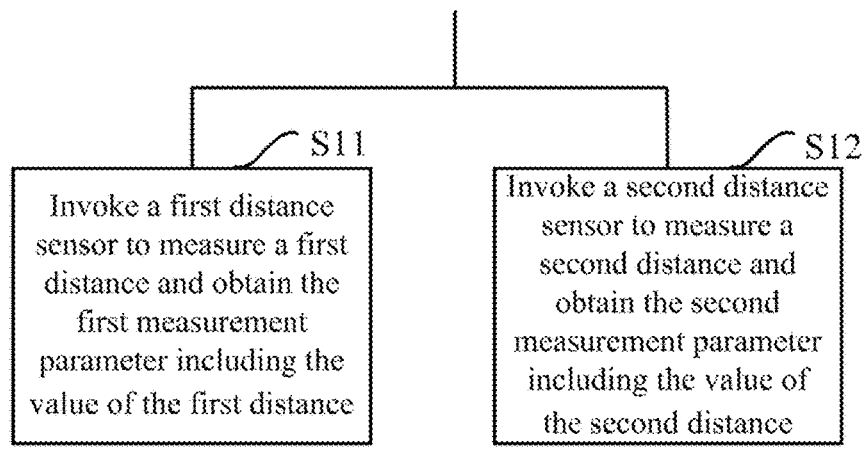
FIG. 2a and FIG. 2b are schematic flow charts of detecting a measurement parameter according to some embodiment of the disclosure.

In an embodiment of the disclosure, the mobile device further includes a first distance sensor and a second distance sensor, and then as illustrated in FIG. 2*a*, the step 102 can include the following sub-steps:

The sub-step S11 is to invoke a first distance sensor to measure a first distance, and to obtain the first measurement parameter including the value of the first distance, where the first distance is the distance between the first distance sensor, and an obstacle relative to the first screen; and/or The sub-step S12 is to invoke a second distance sensor to measure a second distance, and to obtain the second measurement parameter including the value of the second distance, where the second distance is the distance between the second distance sensor, and an obstacle relative to the second screen.

In a particular implementation, typically such a flying time algorithm is applicable to the distance sensors (e.g., the first distance sensor and the second distance sensor) that light pulses at a short wavelength are emitted, intervals of time it takes for the light pulses to be emitted and reflected back are measured, and the distances between the distance sensors and the object are calculated as a function of the measured intervals of time:

$$L=C*t/2;$$

Where L represents the value of a distance, C represents the light velocity, and t represents the difference between the time when the light pulse is emitted, and the time when the light pulse is received.

Of course, in order to improve the precision of the value of the distance, the differences between the times when the light pulses are emitted, and the times when the light pulse are received can be measured, and the distance can be calculated as a function of the average thereof.

Figure 3A:
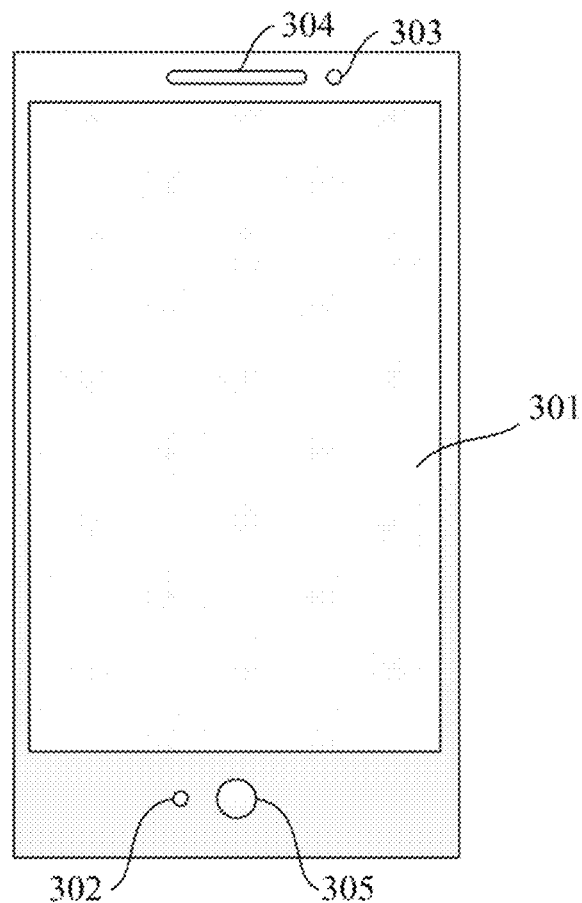
FIG. 3a and FIG. 3b are schematic structural diagrams of a mobile device according to some embodiment of the disclosure.

As illustrated in FIG. 3a, the first distance sensor 302 is oriented the same as the first screen 301, and typically configured at the bottom of the mobile device below the first screen 301, and since an audio picker-up of the terminal is typically arranged on the short sidewall of the mobile terminal, the first distance sensor can be arranged at the end of the mobile terminal where the audio picker-up is arranged.

In addition to the first distance sensor 302, hardware oriented the same as the first screen 301 can include a first camera 303, a headphone 304, a Home key 305, etc., although the embodiments of the disclosure will not be limited thereto.

On one hand, the first distance sensor 302 can detect the first distance between the obstacle on the first screen 301, and the first screen 301.

On the other hand, the first distance sensor 302 can detect the distance between the mobile device, and the face of the user talking on the mobile device, and disable the screen as appropriate.

By way of an example, the first distance sensor 302 detects the distance between the first distance sensor 302, and the obstacle relative to the first screen as the first distance, and obtains the first measure parameter including the value of the first distance.

Of course, the first distance sensor 302 can alternatively be configured at another position on the mobile device, although the embodiments of the disclosure will not be limited thereto.

Figure 3B:
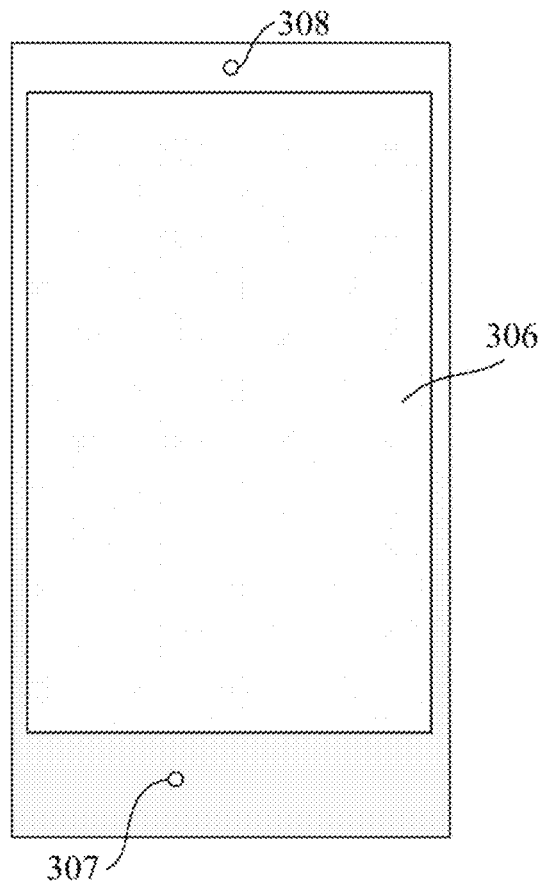

As illustrated in FIG. 3b, the second distance sensor 307 is oriented the same as the second screen 306, and typically configured at the bottom of the mobile device below the second screen 306, and since an audio picker-up of the terminal is typically arranged on the short sidewall of the mobile terminal, the second distance sensor can be arranged at the end of the mobile terminal where the audio picker-up is arranged.

In addition to the second distance sensor 307, hardware oriented the same as the second screen 306 can include a second camera 308, although the embodiments of the disclosure will not be limited thereto.

On one hand, the second distance sensor 307 can detect the first distance between the obstacle on the second screen 306, and the second screen 306.

On the other hand, the second distance sensor 307 can detect the distance between the mobile device, and the face of the user talking on the mobile device, and disable the screen as appropriate.

By way of an example, the second distance sensor 307 detects the distance between the second distance sensor 307, and the obstacle relative to the second screen as the second distance, and obtains the second measure parameter including the value of the second distance.

Of course, the second distance sensor 307 can alternatively be configured at another position on the mobile device, although the embodiments of the disclosure will not be limited thereto.

Additionally a volume button, a standby function button, and other hardware can be configured on the side of the mobile device, although the embodiments of the disclosure will not be limited thereto.

Figure 2B:
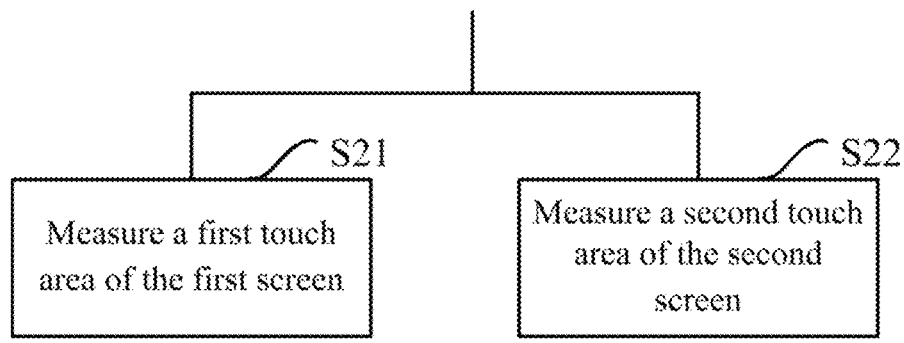

In another embodiment of the disclosure, as illustrated in FIG. 2b, the step 102 can include the following sub-steps:

The sub-step S21 is to measure a first touch area of the first screen; and/or

The sub-step S22 is to measure a second touch area of the second screen.

In an embodiment of the disclosure, the first screen and the second screen are touch screens, and can particularly include a vector pressure sensing touch screen, a resistor touch screen, a capacitive touch screen, an infrared touch screen, a surface sound wave touch screen, an ink screen, etc.

Taking the capacitive touch screen as an example, respective touch points in the capacitive touch screen are distributed at the same density as pixels, so if the user triggers a series of touch points on the capacitive touch screen, then these touch points will constitute an area, commonly referred to as a touch area, and the touch area (e.g., the first touch area or the second touch area) will be the area of the touch area.

Of course, the measurement parameters above are merely exemplary, and in an embodiment of the disclosure, other measurement parameters can be set under a real condition, for example, the first camera can be invoked to acquire first image data, and the second camera can be invoked to acquire second image data, although the embodiments of the disclosure will not be limited thereto. Furthermore those skilled in the art can apply the other measurement parameters as needed in reality in addition to the measurement parameters above, although the embodiments of the disclosure will not be limited thereto.

The step 103 is to identify a screen to be started, from the first screen and the second screen according to the at least one of the first measurement parameter and the second measurement parameter;

In a particular implementation, the first measurement parameter and/or the second measurement parameter can characterize an operating habit of the user, and reflect an operational intension of the user to some extent, so the screen to be started can be identified from the first screen and the second screen based upon the first measurement parameter and/or the second measurement parameter according to the operating habit of the user.

Figure 4A:
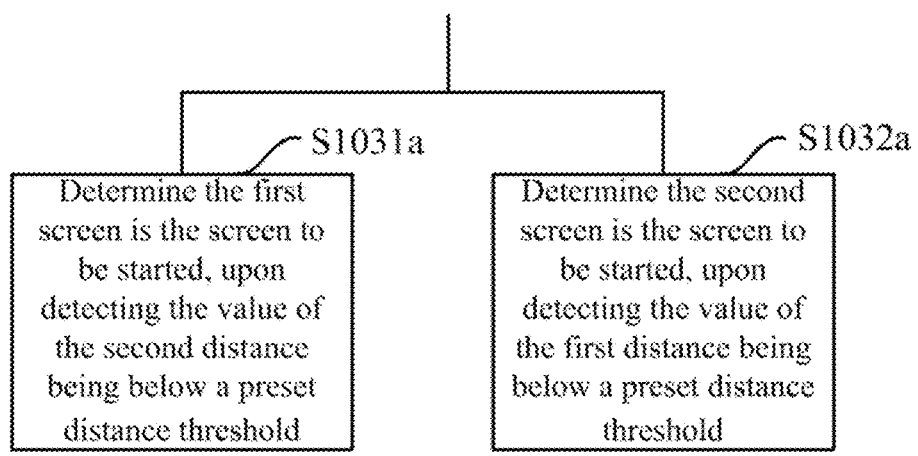

In an embodiment of the disclosure, as illustrated in FIG. 4a, if the first measurement parameter includes the value of the first distance, or the second measurement parameter includes the value of the second distance, then the step 103 will include the following sub-steps:

The sub-step S1031a is to determine that the first screen is the screen to be started, upon detecting the value of the second distance being below a preset distance threshold; or The sub-step S1032a is to determine that the second screen is the screen to be started, upon detecting the value of the first distance being below a preset distance threshold.

Typically if the user accessing the mobile terminal is going to start the screen, then he or she will hold the mobile terminal in his or her hand, and if the value of the second distance measured by the second distance sensor located on the backside of the mobile terminal is below the preset distance threshold, then it will be determined that the primary screen of the mobile terminal, i.e., the first screen, is oriented to the user, and the secondary screen, i.e., the second screen, is oriented away from the user, and placed in the hand of the user. Alike, if the value of the first distance measured by the first distance sensor located on the front side of the mobile terminal is below the preset distance threshold, then it will be determined that the primary screen of the mobile terminal, i.e., the first screen, is placed in the hand of the user, and the secondary screen, i.e., the second screen, is oriented to the user.

In this way, it can be determined which one of the screens is to be operated by the user, according to the distance parameters detected by the first distance sensor and the second distance sensor, and accordingly determined that the screen is the screen to be started.

Figure 4B:
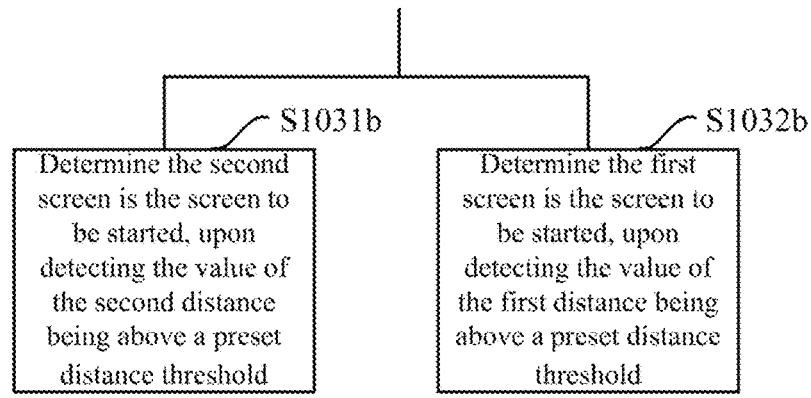

In another implementation, in an embodiment of the disclosure, as illustrated in FIG. 4b, if the first measurement parameter includes the value of the first distance, or the second measurement parameter includes the value of the second distance, then the step 103 will include the following sub-steps:

The sub-step S1031b is to determine that the second screen is the screen to be started, upon detecting the value of the second distance being above a preset distance threshold; or The sub-step S1032b is to determine that the first screen is the screen to be started, upon detecting the value of the first distance being above a preset distance threshold.

Figure 4C:
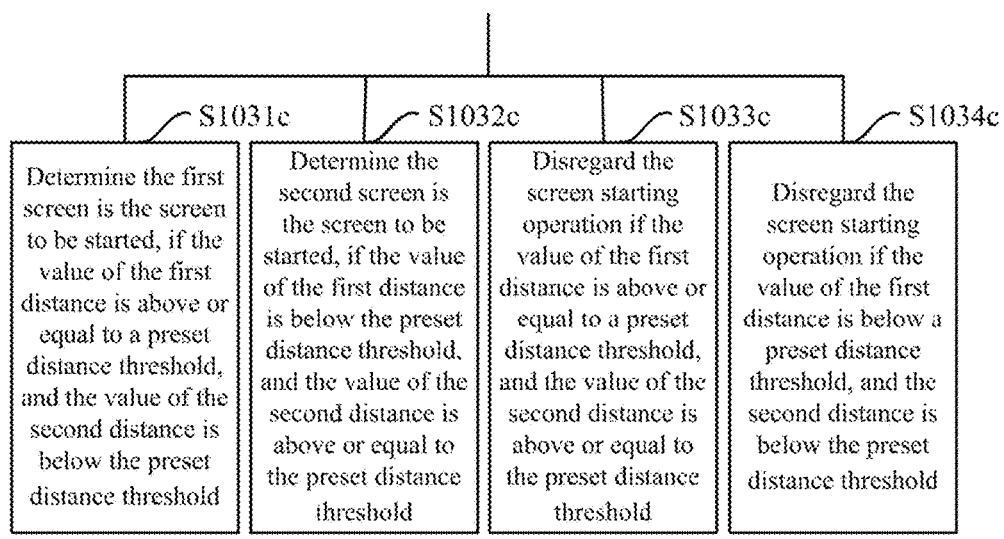

In this implementation, if the value of the second distance being above the preset distance threshold is detected, then it will be determined that the second screen is oriented to the user, that is, the first screen is oriented away from the user, and placed in the hand of the user, so that it will be determined that the second screen is the screen to be started. If the value of the first distance being above the preset distance threshold is detected, then it will be determined that the first screen is oriented to the user, that is, the second screen is oriented away from the user, and placed in the hand of the user, so that it will be determined that the first screen is the screen to be started. In order to detect more precisely the screen to be started, another implementation of S103 is proposed according to some other embodiments of the disclosure, where the screen to be started is determined according to the first distance parameter and the second distance parameter detected by the first distance sensor and the second distance sensor, as illustrated in FIG. 4c, as follows:

The sub-step S1031c is to determine that the first screen is the screen to be started, if the value of the first distance is above or equal to a preset distance threshold, and the value of the second distance is below the preset distance threshold;

As illustrated in FIG. 3a and FIG. 3b, if the user intends to operate on the first screen, then he or she will typically hold the mobile device in his or her hand by supporting the second screen in the hand, clamping the side of the mobile device, and exposing the first screen to the user.

In this case, typically the first distance sensor oriented the same as the first screen will not be shielded, but the second distance sensor oriented the same as the second screen will be shielded, by the hand of the user.

Thus if the value of the first distance is above or equal to the preset distance threshold, then it will indicate that there is no obstacle in front of the first screen at a short distance from the first screen, so that the first screen is not shielded.

If the value of the second distance is below the preset distance threshold, then it will indicate that there is an obstacle in front of the second screen at a short distance from the second screen, so that the second screen is shielded.

This agrees with the user's operating habit of holding the mobile device in his or her hand while being oriented to the first screen, so it can be determined that the first screen is the screen to be started.

The sub-step S1032c is to determine that the second screen is the screen to be started, if the value of the first distance is below the preset distance threshold, and the value of the second distance is above or equal to the preset distance threshold;

As illustrated in FIG. 3a and FIG. 3b, if the user intends to operate on the second screen, then he or she will typically hold the mobile device in his or her hand by supporting the first screen in the hand, clamping the side of the mobile device, and exposing the second screen to the user.

In this case, typically the second distance sensor oriented the same as the second screen will not be shielded, but the first distance sensor oriented the same as the first screen will be shielded, by the hand of the user.

Thus if the value of the first distance is below the preset distance threshold, then it will indicate that there is an obstacle in front of the first screen at a short distance from the first screen, so that the first screen is shielded.

If the value of the second distance is above or equal to the preset distance threshold, then it will indicate that there is no obstacle in front of the second screen at a short distance from the second screen, so that the second screen is not shielded.

This agrees with the user's operating habit of holding the mobile device in his or her hand while being oriented to the second screen, so it can be determined that the second screen is the screen to be started.

The sub-step S1033c is to disregard the screen starting operation if the value of the first distance is above or equal to a preset distance threshold, and the value of the second distance is above or equal to the preset distance threshold;

In an embodiment of the disclosure, if the value of the first distance is above or equal to the preset distance threshold, then it will indicate that there is no obstacle in front of the first screen at a short distance from the first screen, so that the first screen is not shielded.

If the value of the second distance is above or equal to the preset distance threshold, then it will indicate that there is no obstacle in front of the second screen at a short distance from the second screen, so that the second screen is not shielded.

This disagrees with the user's operating habit of holding the mobile device in his or her hand while being oriented to the first screen or the second screen, so this can be determined as an improper operation, and the screen starting operation will be disregarded.

The sub-step S1034c is to disregard the screen starting operation if the value of the first distance is below a preset distance threshold, and the second distance is below the preset distance threshold.

In an embodiment of the disclosure, if the value of the first distance is below the preset distance threshold, then it will indicate that there is an obstacle in front of the first screen at a short distance from the first screen, so that the first screen is shielded.

If the value of the second distance is below the preset distance threshold, then it will indicate that there is an obstacle in front of the second screen at a short distance from the second screen, so that the second screen is shielded.

This disagrees with the user's operating habit of holding the mobile device in his or her hand while being oriented to the first screen or the second screen, so this can be determined as an improper operation, and the screen starting operation will be disregarded.

Figure 4D:
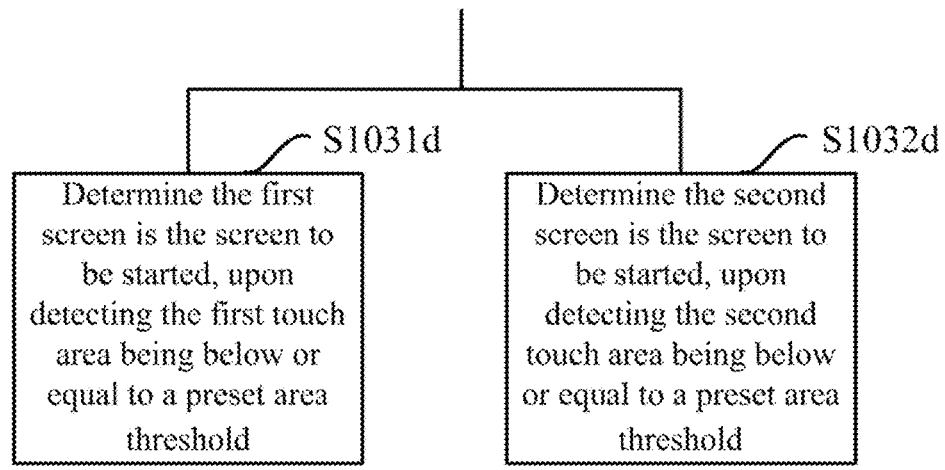

In another embodiment of the disclosure, as illustrated in FIG. 4d, if the first measurement parameter includes the value of the first touch area, or the second measurement parameter includes the value of the second touch area, then the step 103 will include the following sub-steps:

The sub-step S1031*d* is to determine that the first screen is the screen to be started, upon detecting the first touch area being below or equal to a preset area threshold; or The sub-step S1032*d* is to determine that the second screen is the screen to be started, upon detecting the second touch area being below or equal to a preset area threshold.

Typically if the user accessing the mobile terminal intends to operate on the first screen, then he or she will typically hold the mobile device in his or her hand by supporting the second screen in the hand, clamping the side of the mobile device, and exposing the first screen to the user, so that if the first touch area is below or equal to the preset area threshold, then it will be determined that the first area is of the screen oriented to the user, i.e., the screen to be started; and if the user intends to operate on the second screen, then he or she will typically hold the mobile device in his or her hand by supporting the first screen in the hand, clamping the side of the mobile device, and exposing the second screen to the user, so that if the second touch area is below or equal to the preset area threshold, then it will be determined that the second area is of the screen oriented to the user, i.e., the screen to be started In this way, it can be determined which one of the screens is to be operated by the user, according to the first touch area parameter or the second touch area parameter, and accordingly determined that the screen is the screen to be started.

Figure 4E:
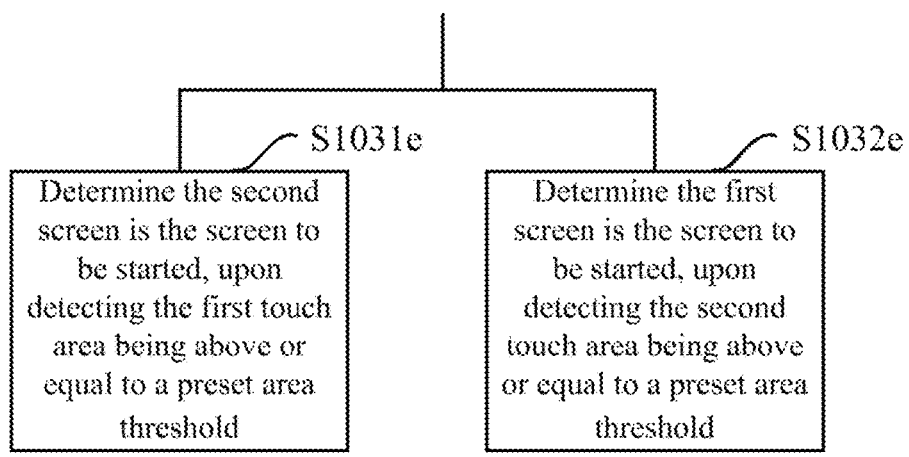

In another implementation, in an embodiment of the disclosure, as illustrated in FIG. 4*e*, if the first measurement parameter includes the value of the first distance, or the second measurement parameter includes the value of the second distance, then the step 103 will include the following sub-steps:

The sub-step S1031*e* is to determine that the second screen is the screen to be started, upon detecting the first touch area being above or equal to a preset area threshold; or The sub-step S1032*e* is to determine that the first screen is the screen to be started, upon detecting the second touch area being above or equal to a preset area threshold.

In this implementation, if the first touch area being above or equal to the preset area threshold is detected, then it will be determined that the second screen is oriented to the user, that is, the first screen is oriented away from the user, and placed in the hand of the user, so that it will be determined that the second screen is the screen to be started. If the second touch area being above or equal to the preset area threshold is detected, then it will be determined that the first screen is oriented to the user, that is, the second screen is oriented away from the user, and placed in the hand of the user, so that it will be determined that the first screen is the screen to be started.

Figure 4F:
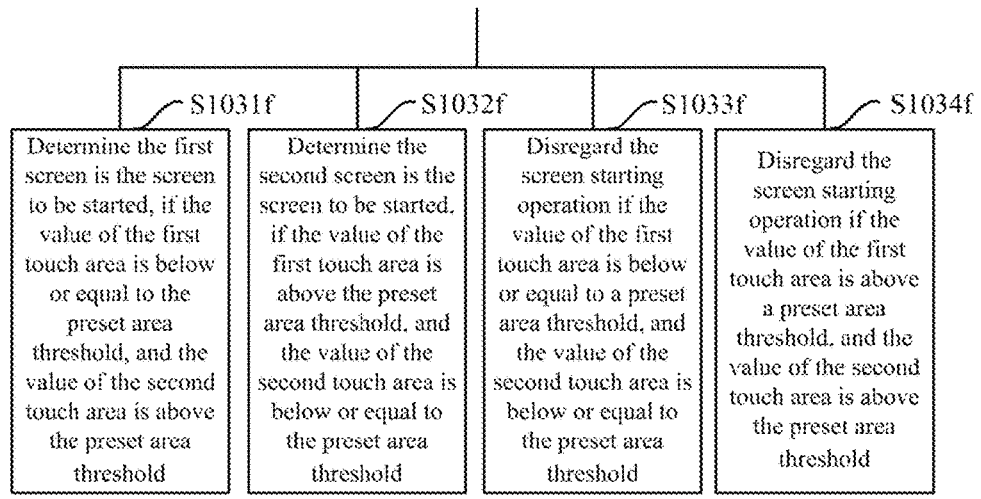

In order to detect more precisely the screen to be started, another implementation of S103 is proposed according to some other embodiments of the disclosure, where the screen to be started is determined according to the first touch area parameter and the second touch area parameter, as illustrated in FIG. 4*f*, as follows:

The sub-step S1031*f* is to determine that the first screen is the screen to be started, if the value of the first touch area is below or equal to the preset area threshold, and the value of the second touch area is above the preset area threshold;

As illustrated in FIG. 3*a* and FIG. 3*b*, if the user intends to operate on the second screen, then he or she will typically hold the mobile device in his or her hand by supporting the second screen in the hand, clamping the side of the mobile device, and exposing the first screen to the user.

In this case, the hand of the user touches the first screen in a typically smaller touch area, and the second screen in a typically larger touch area.

Thus if the value of the first touch area is below or equal to the preset area threshold, then it will indicate that there is a smaller touch area of the first screen.

If the value of the second touch area is above the preset area threshold, then it will indicate that there is a larger touch area of the second screen.

This agrees with the user's operating habit of holding the mobile device in his or her hand while being oriented to the first screen, so that it can be determined that the first screen is the screen to be started.

The sub-step S1032*f* is to determine that the second screen is the screen to be started, if the value of the first touch area is above the preset area threshold, and the value of the second touch area is below or equal to the preset area threshold;

As illustrated in FIG. 3*a* and FIG. 3*b*, if the user intends to operate on the second screen, then he or she will typically hold the mobile device in his or her hand by supporting the first screen in the hand, clamping the side of the mobile device, and exposing the second screen to the user.

In this case, the hand of the user touches the first screen in a typically larger touch area, and the second screen in a typically smaller touch area.

Thus if the value of the first touch area is above the preset area threshold, then it will indicate that there is a larger touch area of the first screen.

If the value of the second touch area is below or equal to the preset area threshold, then it will indicate that there is a smaller touch area of the second screen.

This agrees with the user's operating habit of holding the mobile device in his or her hand while being oriented to the second screen, so that it can be determined that the second screen is the screen to be started.

The sub-step S1033*f* is to disregard the screen starting operation if the value of the first touch area is below or equal to a preset area threshold, and the value of the second touch area is below or equal to the preset area threshold;

In an embodiment of the disclosure, if the value of the first touch area is below or equal to the preset area threshold, then it will indicate that there is a smaller touch area of the first screen.

If the value of the second touch area is below or equal to the preset area threshold, then it will indicate that there is a smaller touch area of the second screen.

This disagrees with the user's operating habit of holding the mobile device in his or her hand while being oriented to the first screen or the second screen, so this can be determined as an improper operation, and the screen starting operation will be disregarded.

The sub-step S1034*f* is to disregard the screen starting operation if the value of the first touch area is above a preset area threshold, and the value of the second touch area is above the preset area threshold.

In an embodiment of the disclosure, if the value of the first touch area is above the preset area threshold, then it will indicate that there is a larger touch area of the first screen.

If the value of the second touch area is above the preset area threshold, then it will indicate that there is a larger touch area of the second screen.

This disagrees with the user's operating habit of holding the mobile device in his or her hand while being oriented to the first screen or the second screen, so this can be determined as an improper operation, and the screen starting operation will be disregarded.

Of course, the screen to be started has been identified as described above merely by way of an example, but in an implementation of the embodiments of the disclosure, the screen to be started can be identified otherwise under a real condition, for example, if the face of the user is detected in the first image data but not detected in the second image data, then the first screen will be determined as the screen to be started; if the face of the user is not detected in the first image data but detected in the second image data, then the second screen will be determined as the screen to be started; if the face of the user is not detected in the first image data and the second image data, then the screen starting operation will be disregarded; and so on, although the embodiments of the disclosure will not be limited thereto. Furthermore those skilled in the art can alternatively identify otherwise the screen to be started, as needed in reality instead of identifying the screen to be started, as described above, although the embodiments of the disclosure will not be limited thereto.

The step 104 is to start the screen to be started, according to the screen starting operation.

If the screen to be started is determined, then the screen to be started will be started for the user to operate, and the other screen will remain locked.

For example, if the screen to be started is the first screen, then the first screen will be started, and the second screen will be locked.

In another example, if the screen to be started is the second screen, then the second screen will be started, and the first screen will be locked.

In an example of the embodiments of the disclosure, for a liquid crystal screen, if the system is suspended, then backlight of the liquid crystal screen will be controlled by a GPIO to be turned off, and no data will be refreshed any more into a buffer (a display buffer, where the respective pixels on the screen are refreshed with the data in the buffer, and further a composed picture is displayed), and if the liquid crystal screen is suspended, then the liquid crystal screen will appear in black to the user without emitting any light.

Thus if the liquid crystal screen is the screen to be started, then the backlight of the liquid crystal screen will be lightened, and a frame of image data will be written into the display buffer of the liquid crystal screen (where the respective pixels on the screen are refreshed with the data in the buffer, and further a composed picture is displayed).

In another example of the embodiments of the disclosure, for an ink screen, the ink screen is composed of a lot of electronic ink which can be regarded as a lot of capsules. There is a liquid electric charge in each capsule (at the position 6), where a positive electric charge is colored in white, and a negative electric charge is colored in black. If positive or negative voltage is applied to a side (the position 8), the charged liquid will be attracted or expelled respectively, so that the respective pixels can display in white or black.

The ink screen can display without any backlight, and since the electronic ink is refreshed inconsecutively, the existing picture can remain unchanged after the electronic ink is refreshed each time, so that the picture will still remain as it is even if the battery is taken away, and the picture can be displayed on the ink screen simply by refreshing the display data in the corresponding buffer.

Thus if the ink screen is the screen to be started, then the frame of image data will be written into the display buffer of the ink screen.

Of course, the screen has been started as described above merely by way of an example, but in an implementation of the embodiments of the disclosure, the screen can be started otherwise under a real condition, although the embodiments of the disclosure will not be limited thereto. Furthermore those skilled in the art can alternatively have the screen started otherwise, as needed in reality instead of having the screen started as described above, although the embodiments of the disclosure will not be limited thereto.

The mobile device according to the embodiments of the disclosure includes at least two screens which are the first screen and the second screen respectively, where if the first screen and the second screen are locked, then if the screen starting operation is detected, then the first measurement parameter of the first screen, and the second measurement parameter of the second screen will be detected to determine the information related to the screen starting operation occurring, it will be determined whether the user's operating habit of holding the mobile device in his or her hand while being oriented to the first screen or the second screen, according to the at least one of the first measurement parameter and the second measurement parameter, and the screen to be started will be identified from the first screen and the second screen, and started, so that the screen can be started adaptively while avoiding the user from operationally selecting the screen manually to thereby improve the convenience in starting the screen, and particularly the user can be avoided from memorizing the correspondence between the screen and a switch button, and toggling the switch button improperly, and starting the screen which would otherwise have not been started, easily resulting in starting the screen unduly, thus improving the accuracy in starting the screen.

It shall be noted that the respective method embodiments above have been described as a series of actions in combination for the sake of a convenient description, but those skilled in the art shall appreciate that the embodiments of the disclosure will not be limited to the order of the actions as described above, so some of the steps can be performed in another order or concurrently without departing from the scope of the disclosure. Secondly those skilled in the art shall also appreciate that all the embodiments described in this specification are preferred embodiments, and the actions and the modules as referred to may not be necessary to the embodiments of the disclosure.

Referring to FIG. 5, there is illustrated a structural block diagram of an apparatus for starting a screen of a mobile device according to an embodiment of the disclosure, where the mobile device includes a first screen and a second screen, and the apparatus can particularly include the following modules:

A screen starting operation detecting module 501 is configured to detect a screen starting operation when the first screen and the second screen are locked;

A measurement parameter detecting module 502 is configured to detect and obtain at least one of a first measurement parameter corresponding to the first screen, and a second measurement parameter corresponding to the second screen;

A screen identifying module 503 is configured to identify a screen to be started, from the first screen and the second screen according to the at least one of the first measurement parameter and the second measurement parameter; and A screen starting module 504 is configured to start the screen to be started, according to the screen starting operation.

In an embodiment of the disclosure, the mobile device further includes a first distance sensor and a second distance sensor, where the first distance sensor is oriented the same as the first screen, and the second distance sensor is the oriented the same as the second screen; and The measurement parameter detecting module 502 can include the following sub-modules:

A first distance measuring sub-module is configured to invoke the first distance sensor to measure a first distance, and to obtain the first measurement parameter including the value of the first distance, where the first distance is the distance between the first distance sensor, and an obstacle relative to the first screen; and A second distance measuring sub-module is configured to invoke the second distance sensor to measure a second distance, and to obtain the second measurement parameter including the value of the second distance, where the second distance is the distance between the second distance sensor, and an obstacle relative to the second screen.

In an embodiment of the disclosure, the screen identifying module 503 is configured:

If the value of the second distance in the second measurement parameter is below a preset distance threshold, to determine the first screen as the screen to be started; in this case, the measurement parameter detecting module 502 is equipped with two distance sensors including the first and the second distance sensor, or only with the second distance sensor. or If the value of the first distance in the first measurement parameter is below a preset distance threshold, to determine the second screen as the screen to be started. In this case, the measurement parameter detecting module 502 is equipped with two distance sensors including the first and the second distance sensor, or only with the first distance sensor.

In another embodiment of the disclosure, the screen identifying module 503 is configured:

To determine that the first screen is the screen to be started, upon detecting the value of the second distance being below a preset distance threshold; in this case, the measurement parameter detecting module 502 is equipped with two distance sensors including the first and the second distance sensor, or only with the second distance sensor. or To determine that the second screen is the screen to be started, upon detecting the value of the first distance being below a preset distance threshold. In this case, the measurement parameter detecting module 502 is equipped with two distance sensors including the first and the second distance sensor, or only with the first distance sensor.

In another embodiment of the disclosure, the screen identifying module 503 is configured:

If the value of the first distance is above or equal to a preset distance threshold, and the value of the second distance is below the preset distance threshold, to determine that the first screen is the screen to be started; and If the value of the first distance is below the preset distance threshold, and the value of the second distance is above or equal to the preset distance threshold, to determine that the second screen is the screen to be started.

In this case, the measurement parameter detecting module 502 is equipped with two distance sensors.

In another embodiment of the disclosure, the screen identifying module 503 is configured:

If the value of the first distance is above or equal to a first preset distance threshold, and the value of the second distance is below a second preset distance threshold, to determine that the first screen is the screen to be started; and If the value of the first distance is below the second preset distance threshold, and the value of the second distance is above or equal to the first preset distance threshold, to determine that the second screen is the screen to be started.

Wherein, the first preset distance threshold is above or equal to the second preset distance threshold.

In this case, the measurement parameter detecting module 502 is equipped with two distance sensors.

In an embodiment of the disclosure, the screen identifying module 503 can be further configured:

If the value of the first distance is above or equal to a preset distance threshold, and the value of the second distance is above or equal to the preset distance threshold, to disregard the screen starting operation; or If the value of the first distance is below a preset distance threshold, and the value of the second distance is below the preset distance threshold, to disregard the screen starting operation. In this case, the terminal is equipped with two distance sensors.

In another embodiment of the disclosure, the measurement parameter detecting module 502 can include the following sub-modules:

A first touch area detecting sub-module is configured to detect a first touch area of the first screen, and to obtain the first measurement parameter including the value of the first touch area; and/or A second touch area detecting sub-module is configured to detect a second touch area of the second screen, and to obtain the second measurement parameter including the value of second touch area.

In another embodiment of the disclosure, the screen identifying module 503 can perform the following functions:

If the value of the first touch area in the first measurement parameter is below or equal to a preset area threshold, to determine that the first screen is the screen to be started; in this case, the measurement parameter detecting module 502 is equipped with the first touch area detecting sub-module and the second touch area detecting sub-module, or only with the first touch area detecting sub-module. or, If the value of the second touch area in the second measurement parameter is below or equal to a preset area threshold, to determine that the second screen is the screen to be started. in this case, the measurement parameter detecting module 502 is equipped with the first touch area detecting sub-module and the second touch area detecting sub-module, or only with the second touch area detecting sub-module.

In another embodiment of the disclosure, the screen identifying module 503 can perform the following functions:

To determine that the second screen is the screen to be started, upon detecting the first touch area being above or equal to a preset area threshold; in this case, the measurement parameter detecting module 502 is equipped with the first touch area detecting sub-module and the second touch area detecting sub-module, or only with the first touch area detecting sub-module; or To determine that the first screen is the screen to be started, upon detecting the second touch area being above or equal to a preset area threshold. in this case, the measurement parameter detecting module 502 is equipped with the first touch area detecting sub-module and the second touch area detecting sub-module, or only with the second touch area detecting sub-module.

In another embodiment of the disclosure, the screen identifying module 503 can perform the following functions:

If the value of the first touch area is below or equal to a preset area threshold, and the value of the second touch area is above the preset area threshold, to determine that the first screen is the screen to be started; or If the value of the first touch area is above the preset area threshold, and the value of the second touch area is below or equal to the preset area threshold, to determine that the second screen is the screen to be started. in this case, the measurement parameter detecting module 502 is equipped with the first touch area detecting sub-module and the second touch area detecting sub-module.

In another embodiment of the disclosure, the screen identifying module 503 performs the following functions:

If the value of the first touch area is below or equal to a first preset area threshold, and the value of the second touch area is above a second preset area threshold, to determine that the first screen is the screen to be started; or If the value of the first touch area is above the second preset area threshold, and the value of the second touch area is below or equal to the first preset area threshold, to determine that the second screen is the screen to be started.

Wherein, the first preset distance threshold is below or equal to the second preset distance threshold.

In this case, the measurement parameter detecting module 502 is equipped with the first touch area detecting sub-module and the second touch area detecting sub-module.

In another embodiment of the disclosure, the screen identifying module 503 can further perform the following functions:

If the value of the first touch area is below or equal to a preset area threshold, and the value of the second touch area is below or equal to the preset area threshold, to disregard the screen starting operation; or If the value of the first touch area is above a preset area threshold, and the value of the second touch area is above the preset area threshold, to disregard the screen starting operation.

In this case, the measurement parameter detecting module 502 is equipped with the first touch area detecting sub-module and the second touch area detecting sub-module.

In an example of the embodiments of the disclosure, the first screen is a liquid crystal screen, and the second screen is an ink screen; or the first screen is an ink screen, and the second screen is a liquid crystal screen; and The screen starting module 504 can include the following sub-modules (not illustrated):

A backlight lightening sub-module is configured to lighten backlight of the liquid crystal screen if the liquid crystal screen is the screen to be started; and A first write buffering sub-module is configured to write a frame of image data in a display buffer of the liquid crystal screen; or A second write buffering sub-module is configured to write a frame of image data in a display buffer of the ink screen if the ink screen is the screen to be started.

Since the apparatus embodiments are substantially similar to the method embodiments, they have been described relatively briefly, and reference can be made to the description of their counterparts in the method embodiments.

An embodiment of the disclosure further provides an apparatus for starting a screen, which is applicable to a mobile device including a first screen and a second screen, and as illustrated in FIG. 6, the apparatus includes:

A memory 601 is configured to store at least one computer readable program code; and A processor 602 is configured to execute the program code stored in the memory 601 to perform: detecting a screen starting operation; detecting and obtaining a first measurement parameter corresponding to the first screen, and/or a second measurement parameter corresponding to the second screen; identifying a screen to be started, from the first screen and the second screen according to the first measurement parameter and/or the second measurement parameter; and starting the determined screen.

In an embodiment of the disclosure, the mobile device further includes a first distance sensor and a second distance sensor, where the first distance sensor is oriented the same as the first screen, and the second distance sensor is the oriented the same as the second screen; and in another embodiment of the disclosure, the first distance sensor is located below the first screen proximate to an audio picker-up of the mobile device, and the second distance sensor is located below the second screen proximate to the audio picker-up of the mobile device.

The processor 602 is further configured to execute the program code to perform: invoking the first distance sensor and the second distance sensor, and obtaining the first measurement parameter, including the value of the first distance, fed back by the first distance sensor, and the second measurement parameter, including the value of a second distance, fed back by the second distance sensor;

The first distance sensor is configured to be invoked by the processor 602 to measure the first distance, where the first distance is the distance between the first distance sensor, and an obstacle relative to the first screen; and The second distance sensor is configured to be invoked by the processor 602 to measure the second distance, where the second distance is the distance between the second distance sensor, and an obstacle relative to the second screen.

In some embodiments of the disclosure, the processor configured to execute the program code to determine the screen to be started, from the first screen and the second screen according to the first measurement parameter or the second measurement parameter is configured:

If the value of the second distance in the second measurement parameter is below a preset distance threshold, to determine the first screen as the screen to be started; or If the value of the first distance in the first measurement parameter is below a preset distance threshold, to determine the second screen as the screen to be started.

In some embodiments of the disclosure, the processor configured to execute the program code to determine the screen to be started, from the first screen and the second screen according to the first measurement parameter and the second measurement parameter is configured:

To determine that the second screen is the screen to be started, upon detecting the value of the second distance being above a preset distance threshold; or To determine that the first screen is the screen to be started, upon detecting the value of the first distance being above a preset distance threshold.

In some embodiments of the disclosure, the processor configured to execute the program code to determine the screen to be started, from the first screen and the second screen according to the first measurement parameter and the second measurement parameter is configured: if the value of the first distance in the first measurement parameter is above or equal to a preset distance threshold, and the value of the second distance in the second measurement parameter is below the preset distance threshold, to determine that the first screen is the screen to be started; or If the value of the first distance in the first measurement parameter is below a preset distance threshold, and the value of the second distance in the second measurement parameter is above or equal to the preset distance threshold, to determine that the second screen is the screen to be started; or If the value of the first distance in the first measurement parameter is above or equal to a preset distance threshold, and the value of the second distance in the second measurement parameter is above or equal to the preset distance threshold, to disregard the screen starting operation; or If the value of the first distance in the first measurement parameter is below a preset distance threshold, and the value of the second distance in the second measurement parameter is below the preset distance threshold, to disregard the screen starting operation.

In some embodiments of the disclosure, the processor 602 configured to execute the program code to detect and obtain the first measurement parameter corresponding to the first screen, and the second measurement parameter corresponding to the second screen is configured:

To measure a first touch area of the first screen, and to obtain the first measurement parameter including the value of the first touch area; and To measure a second touch area of the second screen, and to obtain the second measurement parameter including the value of second touch area.

In some embodiments of the disclosure, the processor 602 configured to execute the program code to determine the screen to be started, from the first screen and the second screen according to the first measurement parameter or the second measurement parameter is configured:

If the value of the first touch area in the first measurement parameter is below or equal to a preset area threshold, to determine that the first screen is the screen to be started; or If the value of the second touch area in the second measurement parameter is below or equal to a preset area threshold, to determine that the second screen is the screen to be started.

In some embodiments of the disclosure, the processor 602 configured to execute the program code to determine the screen to be started, from the first screen and the second screen according to the first measurement parameter and the second measurement parameter is configured:

To determine that the second screen is the screen to be started, upon detecting the first touch area being above or equal to a preset area threshold; or To determine that the first screen is the screen to be started, upon detecting the second touch area being above or equal to a preset area threshold.

In some embodiments of the disclosure, the processor 602 configured to execute the program code to determine the screen to be started, from the first screen and the second screen according to the first measurement parameter and the second measurement parameter is configured:

If the value of the first touch area in the first measurement parameter is below or equal to a preset area threshold, and the value of the second touch area in the second measurement parameter is above the preset area threshold, to determine that the first screen is the screen to be started; or If the value of the first touch area in the first measurement parameter is above a preset area threshold, and the value of the second touch area in the second measurement parameter is below or equal to the preset area threshold, to determine that the second screen is the screen to be started; or If the value of the first touch area in the first measurement parameter is below or equal to a preset area threshold, and the value of the second touch area in the second measurement parameter is below or equal to the preset area threshold, to disregard the screen starting operation; or If the value of the first touch area in the first measurement parameter is above a preset area threshold, and the value of the second touch area in the second measurement parameter is above the preset area threshold, to disregard the screen starting operation.

In some embodiments of the disclosure, the first screen is a liquid crystal screen, and the second screen is an ink screen; or the first screen is an ink screen, and the second screen is a liquid crystal screen; and The processor 602 configured to execute the program code to start the screen to be started is configured: to lighten backlight of the liquid crystal screen if the liquid crystal screen is the screen to be started; and To write a frame of image data in a display buffer of the liquid crystal screen; or To write a frame of image data in a display buffer of the ink screen if the ink screen is the screen to be started.

Some embodiments of the disclosure provide a mobile device as illustrated in FIG. 7 including:

A first screen 701, a second screen 702, and a screen starting apparatus 703, where the screen starting apparatus 703 is configured:

To detect a screen starting operation; to detect and obtain at least one of a first measurement parameter corresponding to the first screen, and a second measurement parameter corresponding to the second screen; to determine a screen to be started, from the first screen and the second screen according to the at least one of the first measurement parameter and the second measurement parameter; and starting the determined screen; and to start the determined screen.

In some embodiments of the disclosure, the mobile device further includes a first distance sensor and a second distance sensor, where the first distance sensor is oriented the same as the first screen, and the second distance sensor is the oriented the same as the second screen; and then the screen starting apparatus 703 is further configured to invoke at least one of the first distance sensor and the second distance sensor, and to accordingly obtain at least one of the first measurement parameter, including the value of the first distance, fed back by the first distance sensor, and the second measurement parameter, including the value of a second distance, fed back by the second distance sensor;

The first distance sensor is configured to be invoked by the screen starting apparatus 703 to measure the first distance, where the first distance is the distance between the first distance sensor, and an obstacle relative to the first screen; and The second distance sensor is configured to be invoked by the screen starting apparatus 703 to measure the second distance, where the second distance is the distance between the second distance sensor, and an obstacle relative to the second screen.

In some embodiments of the disclosure, the first distance sensor is located below the first screen proximate to the end of the mobile device where an audio picker-up is arranged, and the second distance sensor is located below the second screen proximate to the end of the mobile device where an audio picker-up is arranged. In some embodiments of the disclosure, the screen starting apparatus 703 configured to determine the screen to be started, from the first screen and the second screen according to the at least one of the first measurement parameter and the second measurement parameter is configured: if the value of the second distance in the second measurement parameter is below a preset distance threshold, to determine the first screen as the screen to be started; or if the value of the first distance in the first measurement parameter is below a preset distance threshold, to determine the second screen as the screen to be started.

In some embodiments of the disclosure, the screen starting apparatus 703 configured to determine the screen to be started, from the first screen and the second screen according to the at least one of the first measurement parameter and the second measurement parameter is configured: if the value of the first distance in the first measurement parameter is above or equal to a preset distance threshold, and the value of the second distance in the second measurement parameter is below the preset distance threshold, to determine that the first screen is the screen to be started; or if the value of the first distance in the first measurement parameter is below a preset distance threshold, and the value of the second distance in the second measurement parameter is above or equal to the preset distance threshold, to determine that the second screen is the screen to be started.

In some embodiments of the disclosure, the screen starting apparatus 703 configured to determine the screen to be started, from the first screen and the second screen according to the at least one of the first measurement parameter and the second measurement parameter is configured: to determine that the second screen is the screen to be started, upon detecting the value of the second distance being above a preset distance threshold; or to determine that the first screen is the screen to be started, upon detecting the value of the first distance being above a preset distance threshold.

In some embodiments of the disclosure, the screen starting apparatus 703 configured to determine the screen to be started, from the first screen and the second screen according to the at least one of the first measurement parameter and the second measurement parameter is configured: if the value of the first distance in the first measurement parameter is above or equal to a preset distance threshold, and the value of the second distance in the second measurement parameter is above or equal to the preset distance threshold, to disregard the screen starting operation; or if the value of the first distance in the first measurement parameter is below a preset distance threshold, and the value of the second distance in the second measurement parameter is below the preset distance threshold, to disregard the screen starting operation.

In some embodiments of the disclosure, the screen starting apparatus 703 configured to detect and obtain the at least one of the first measurement parameter corresponding to the first screen, and the second measurement parameter corresponding to the second screen is configured: to measure a first touch area of the first screen, and to obtain the first measurement parameter including the value of the first touch area; and to measure a second touch area of the second screen, and to obtain the second measurement parameter including the value of second touch area.

In some embodiments of the disclosure, the screen starting apparatus 703 configured to determine the screen to be started, from the first screen and the second screen according to the at least one of the first measurement parameter and the second measurement parameter is configured: if the value of the first touch area in the first measurement parameter is below or equal to a preset area threshold, to determine that the first screen is the screen to be started; or if the value of the second touch area in the second measurement parameter is below or equal to a preset area threshold, to determine that the second screen is the screen to be started.

In some embodiments of the disclosure, the screen starting apparatus 703 configured to determine the screen to be started, from the first screen and the second screen according to the at least one of the first measurement parameter and the second measurement parameter is configured: to determine that the second screen is the screen to be started, upon detecting the first touch area being above or equal to a preset area threshold; or to determine that the first screen is the screen to be started, upon detecting the second touch area being above or equal to a preset area threshold.

In some embodiments of the disclosure, the screen starting apparatus 703 configured to determine the screen to be started, from the first screen and the second screen according to the at least one of the first measurement parameter and the second measurement parameter is configured: if the value of the first touch area in the first measurement parameter is below or equal to a preset area threshold, and the value of the second touch area in the second measurement parameter is above the preset area threshold, to determine that the first screen is the screen to be started; or if the value of the first touch area in the first measurement parameter is above a preset area threshold, and the value of the second touch area in the second measurement parameter is below or equal to the preset area threshold, to determine that the second screen is the screen to be started.

In some embodiments of the disclosure, the screen starting apparatus 703 configured to determine the screen to be started, from the first screen and the second screen according to the at least one of the first measurement parameter and the second measurement parameter is configured: if the value of the first touch area in the first measurement parameter is below or equal to a preset area threshold, and the value of the second touch area in the second measurement parameter is below or equal to the preset area threshold, to disregard the screen starting operation; or if the value of the first touch area in the first measurement parameter is above a preset area threshold, and the value of the second touch area in the second measurement parameter is above the preset area threshold, to disregard the screen starting operation.

In some the embodiments of the disclosure, the first screen is a liquid crystal screen, and the second screen is an ink screen; or the first screen is an ink screen, and the second screen is a liquid crystal screen; and the screen starting apparatus 703 configured to start the determined screen is configured: if the liquid crystal screen is the screen to be started, to start backlight of the liquid crystal screen; and to write a frame of image data in a display buffer of the liquid crystal screen; or if the ink screen is the screen to be started, to write a frame of image data in a display buffer of the ink screen.

The respective embodiments in this specification have been described progressively, each of the embodiments has been described by focusing on its differences from the other embodiments, and the description of their commonalties can be applied to each other.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Accordingly the appended claims are intended to be construed as encompassing the preferred embodiments and all the modifications and variations coming into the scope of the disclosure.

Lastly it shall be further noted that such relationship terms in this context as first and second, etc., are merely intended to distinguish one entity or operation from another entity or operation, but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The method for starting a screen of a mobile device, and the apparatus for starting a screen of a mobile device, according to the embodiments of the disclosure have been described above in details, and the principle of the disclosure and the embodiments thereof have been set forth in this context by way of several examples, but the embodiments above have been described only for the purpose of facilitating understanding of the method of the disclosure and the core idea thereof; and moreover those ordinarily skilled in the art can modify the embodiments and application scopes of the disclosure without departing from the spirit of the disclosure, and in summary the disclosure of the disclosure will not be construed as limiting the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for starting a screen of a dual-screen mobile device comprising a first screen, a second screen, a first distance sensor and a second distance sensor, the first sensor oriented in a same direction as the first screen and the second sensor oriented in a same direction as the second screen, the method comprising:
    monitoring an operation for starting one of the first and second screens of the dual-screen mobile device;
    detecting and obtaining at least one of a first measurement parameter corresponding to the first screen and a second measurement parameter corresponding to the second screen, by invoking the first distance sensor to measure a first distance between the first distance sensor and an obstacle relative to the first screen and obtaining the first measurement parameter to include a value of the first distance, and/or by invoking the second distance sensor to measure a second distance between the second distance sensor and the obstacle relative to the second screen and obtaining the second measurement parameter to include a value of the second distance;
    determining a screen to be started from the first screen and the second screen according to the detected at least one of the first measurement parameter and the second measurement parameter, including disregarding the screen starting operation when the value of the first distance in the first measurement parameter is greater than or equal to a preset distance threshold and the value of the second distance in the second measurement parameter is greater than or equal to the preset distance threshold, or disregarding the screen starting operation when the value in the first distance in the first measurement parameter is less than the preset distance threshold and the value of the second distance in the second measurement parameter is less than the preset distance threshold; and
    when the screen starting operation is not disregarded, starting the determined screen.

2. The method according to claim 1, wherein determining the screen to be started from the first screen and the second screen according to the detected at least one of the first measurement parameter and the second measurement parameter further comprises:
    when the value of the second distance in the second measurement parameter is less than the preset distance threshold, determining the first screen as the screen to be started; or
    when the value of the first distance in the first measurement parameter is less than the preset distance threshold, determining the second screen as the screen to be started.

3. The method according to claim 1, wherein determining the screen to be started from the first screen and the second screen according to the detected at least one of the first measurement parameter and the second measurement parameter further comprises:
    when the value of the first distance in the first measurement parameter is greater than or equal to the preset distance threshold, and the value of the second distance in the second measurement parameter is less than the preset distance threshold, determining that the first screen is the screen to be started; or when the value of the first distance in the first measurement parameter is less than a preset distance threshold, and the value of the second distance in the second measurement parameter is greater than or equal to the preset distance threshold, determining that the second screen is the screen to be started.

4. A method for starting a screen of a dual-screen mobile device comprising a first screen and a second screen, the method comprising: monitoring an operation for starting one of the first and second screens of the dual screen mobile device; detecting and obtaining at least one of a first measurement parameter corresponding to the first screen and a second measurement parameter corresponding to the second screen, by measuring a first touch area of the first screen and obtaining the first measurement parameter to include a value of the first touch area, and/or measuring a second touch area of the second screen and obtaining the second measurement parameter to include a value of the second touch area; determining a screen to be started from the first screen and the second screen according to the detected at least one of the first measurement parameter and the second measurement parameter, including disregarding the screen starting operation when the value of the first touch area in the first measurement parameter is less than or equal to a preset area threshold and the value of the second touch area in the second measurement parameter is less than or equal to the preset area threshold, or disregarding the screen starting operation when the value of the first touch area in the first measurement parameter is greater than the preset area threshold and the value of the second touch area in the second measurement parameter is greater than the preset area threshold; and when the screen starting operation is not disregarded, starting the determined screen.

5. The method according to claim 4, wherein determining the screen to be started from the first screen and the second screen according to the detected at least one of the first measurement parameter and the second measurement parameter further comprises:

when the value of the first touch area in the first measurement parameter is less than or equal to the preset area threshold, determining that the first screen is the screen to be started; or when the value of the second touch area in the second measurement parameter is less than or equal to the preset area threshold, determining that the second screen is the screen to be started.

6. The method according to claim 4, wherein determining the screen to be started from the first screen and the second screen according to the detected at least one of the first measurement parameter and the second measurement parameter further comprises:

when the value of the first touch area in the first measurement parameter is less than or equal to the preset area threshold and the value of the second touch area in the second measurement parameter is greater than the preset area threshold, determining that the first screen is the screen to be started; or when the value of the first touch area in the first measurement parameter is greater than a preset area threshold and the value of the second touch area in the second measurement parameter is less than or equal to the preset area threshold, determining that the second screen is the screen to be started.

7. A mobile device, comprising:
a first screen;
a second screen;
a first distance sensor corresponding to the first screen;
a second distance sensor corresponding to the second screen;
a memory storing computer-executable instructions; and
a processor in communication with the memory, the first screen and the second screen, the processor configured to execute the computer-executable instructions to:
monitor an operation for starting one of the first and second screens of the dual-screen mobile device;
detect and obtain at least one of a first measurement parameter corresponding to the first screen and a second measurement parameter corresponding to the second screen by invoking the first distance sensor to measure a first distance between the first distance sensor and an obstacle relative to the first screen the first measurement parameter to include a value of the first distance, and/or by invoking the second distance sensor to measure a second distance between the second distance sensor and the obstacle relative to the second screen and obtaining the second measurement parameter to include a value of the second distance;
determine a screen to be started, from the first screen and the second screen according to the detected at least one of the first measurement parameter and the second measurement parameter, including disregarding the screen starting operation when the value of the first distance in the first measurement parameter is greater than or equal to a preset distance threshold and the value of the second distance in the second measurement parameter is greater than or equal to the preset distance threshold, or disregarding the screen starting operation when the value in the first distance in the first measurement parameter is less than the preset distance threshold and the value of the second distance in the second measurement parameter is less than the preset distance threshold; and
when the screen starting operation is not disregarded, start the determined screen.

8. The mobile device according to claim 7, wherein the first distance sensor is located below the first screen proximate to an end of the mobile device where a first audio pick-up is arranged, and the second distance sensor is located below the second screen proximate to an end of the mobile device where a second audio pick-up is arranged.

9. The mobile device according to claim 7, wherein the processor is configured to execute the computer-executable instructions to determine the screen to be started from the first screen and the second screen according to the detected at least one of the first measurement parameter and the second measurement parameter:

when the value of the second distance in the second measurement parameter is less than the preset distance threshold, determining the first screen as the screen to be started; or when the value of the first distance in the first measurement parameter is less than the preset distance threshold, determining the second screen as the screen to be started.

10. The mobile device according to claim 7, wherein the processor is configured to execute the computer-executable instructions to determine the screen to be started from the first screen and the second screen according to the at least one of the first measurement parameter and the second measurement parameter by:

when the value of the first distance in the first measurement parameter is greater than or equal to the preset distance threshold and the value of the second distance in the second measurement parameter is less than the preset distance threshold, determining that the first screen is the screen to be started; or when the value of the first distance in the first measurement parameter is below a preset distance threshold and the value of the second distance in the second measurement parameter is less than or equal to the preset distance threshold, determining that the second screen is the screen to be started.

11. The mobile device according to claim 7, wherein at least one of the first screen and the second screen is a liquid crystal screen and the other of the first screen and the second screen is an ink screen; and wherein the processor is configured to:

when the liquid crystal screen is the screen to be started, start a backlight of the liquid crystal screen and write a frame of image data in a display buffer of the liquid crystal screen; or when the ink screen is the screen to be started, write a frame of image data in a display buffer of the ink screen.

* * * * *